S. A. REEVE.
CALORIMETER.
APPLICATION FILED JAN. 11, 1910.
1,008,065.
Patented Nov. 7, 1911.
2 SHEETS—SHEET 1.
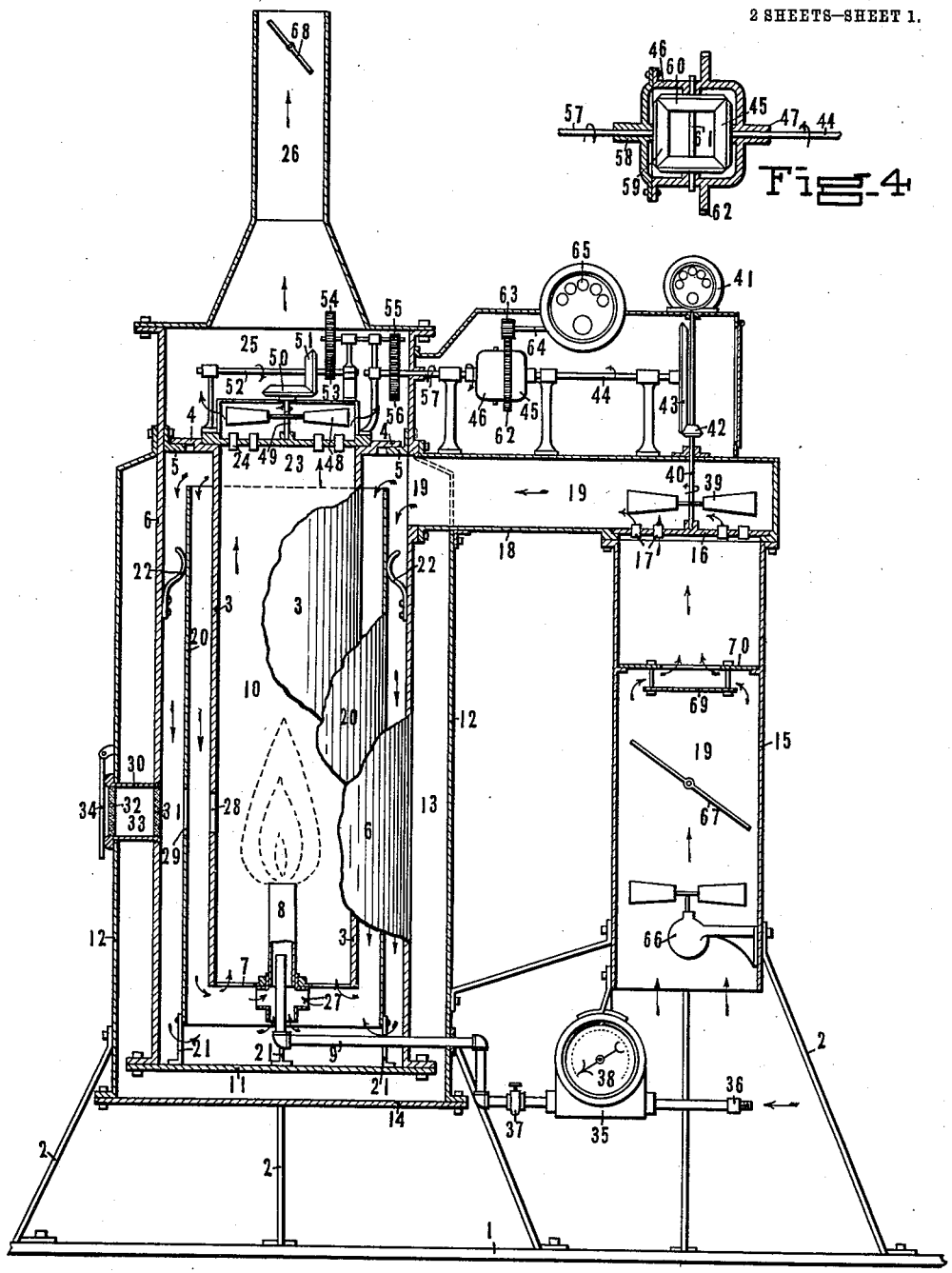
WITNESSES:
INVENTOR
SIDNEY A. REEVE.
BY
ATTORNEY

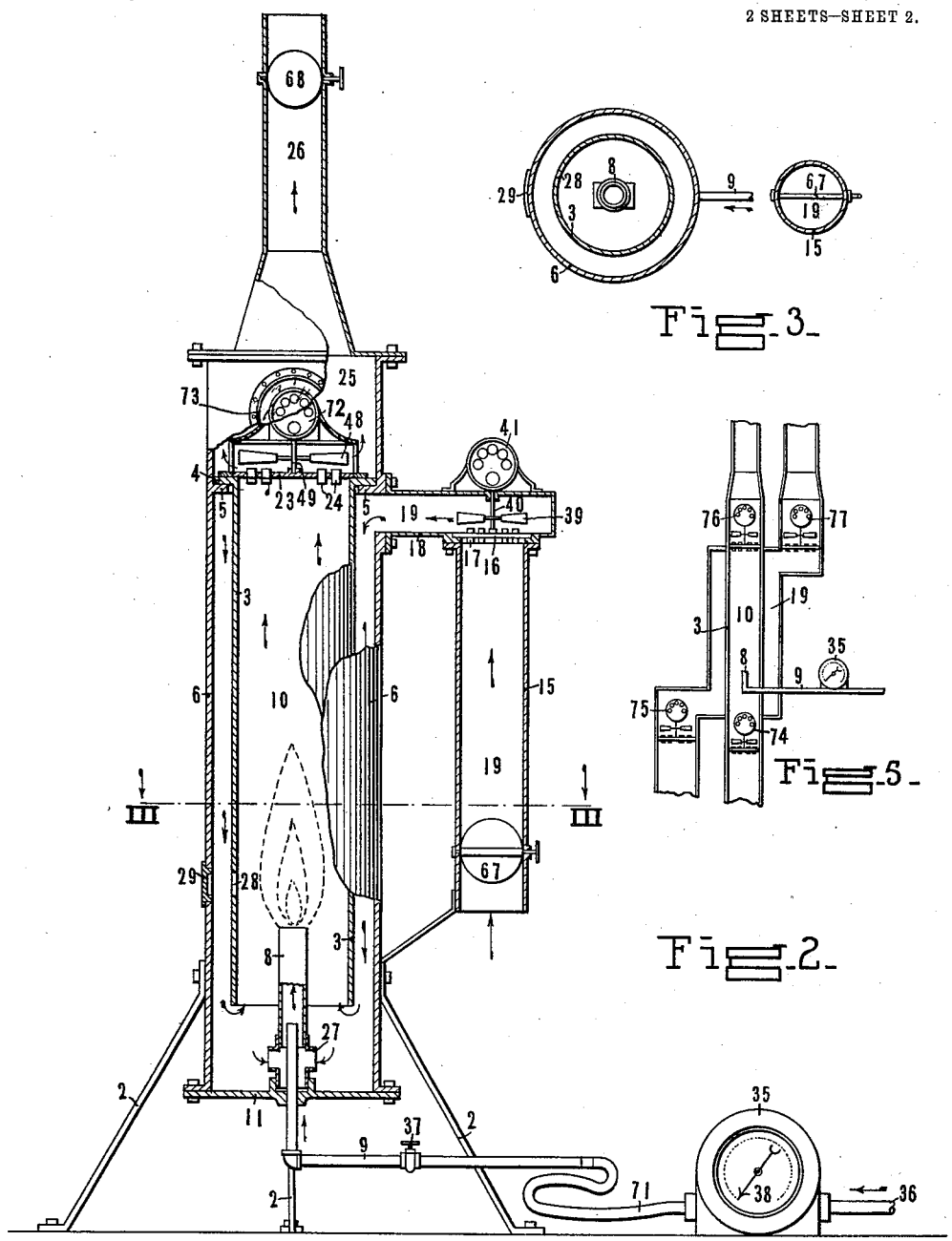

UNITED STATES PATENT OFFICE.

SIDNEY A. REEVE, OF NEW HAVEN, CONNECTICUT, ASSIGNOR TO ROTARY METER COMPANY, A CORPORATION OF NEW YORK.

CALORIMETER.

1,008,065. Specification of Letters Patent. Patented Nov. 7, 1911.

Application filed January 11, 1910. Serial No. 537,388.

*To all whom it may concern:*

Be it known that I, SIDNEY A. REEVE, a citizen of the United States, and a resident of the city of New Haven, county of New Haven, and State of Connecticut, have invented certain new and useful Improvements in Calorimeters, as set forth in the following specification.

This invention relates to the art of determining and recording the energy developed in a chemical reaction by means of a determination and record of the volumetric expansion of the substances concerned therein, which are preferably gaseous in form. More particularly, it relates to the art of determining and recording the calorific power of combustible liquid and gases.

An object of the invention is to enable one, even a comparatively unskilled person, to determine and record, or have recorded automatically, the calorific power of fluids, with reliability, convenience and despatch.

It is further the object of the invention to afford means for integrating the total amount of heat developed within any desired period of time; whereby the selection of a short period of time will give the operator a comparatively instantaneous determination of calorific power, while the selection of a longer period will afford a determination of the average calorific power during that entire period.

It is further the object to permit the reading of what I have called "instantaneous" values for periods of time shorter than those now practicable, while not interfering at all with the automatic integration and record of the average calorific power during a much longer period than is now practicable; which longer period may cover or include as many of the short-period determinations as may be desired.

To these ends it is the purpose of the invention to select a heat-absorbing fluid which shall be as sensitive as possible to momentary variations in the rate of supply, or in the calorific power, of the fuel. For this purpose air, with its low specific heat and its small weight of substance within the instrument at any one time, is preferable to water, as a cooling-agent. At the same time, air furnishes a method of determination of temperature-rise, by observation of the resultant volumetric expansion of the air itself, rather than of the mercury within a thermometer immersed therein, and is more accurate, more sensitive and more practicable of automatic recordation. In the use of water as a cooling-agent, as has been usual heretofore, a single determination of calorific power involves the simultaneous reading of two thermometers over a considerable period of time together with a quantity-reading of water passed, usually by weight. These readings not only demand skill for their proper performance, but they are impracticable of automatic recordation. Further, the presence within the instrument of a considerable weight of water, which will affect the showing of the exit-thermometer until it has all been thoroughly displaced, makes frequent readings of calorific power impossible. For these reasons the use of air as a cooling-agent, and the observation of its temperature-change by a comparison of volumeters, which can practicably integrate the showings over indefinitely long period of time, itself constitutes a novel and useful invention.

In practicing the invention a heater having a combustion chamber is provided and the fuel to be tested is conducted to this combustion chamber in a suitable manner. Atmospheric air is also conducted to the heater in any suitable manner. Combustion is caused to take place within the chamber. The amount of air conducted to the heater may, preferably, be in excess of the amount required for complete combustion of the gas and the amount in excess serves as a cooling or heat-absorbing agent. It does not necessarily all enter the combustion-chamber, however. The rate at which fuel is supplied to the combustion chamber is measured in any suitable manner, and likewise the volume-rate of air supplied to the heater is measured in any suitable manner. Provision is also made for conducting all the gaseous products, including products of combustion and cooling air, away from said heater after combustion has taken place, and means is provided for measuring the volume rate at which such gaseous products are conducted away from the combustion chamber.

With a preferred embodiment and according to a preferred practice of the invention, a fuel-meter of any approved type may be employed for indicating the quantity of fuel passing through it to the combustion chamber. A suitable volumetric or impulse meter is employed to measure the air conducted to the heater, and a second suitable volumetric or impulse meter is employed to measure the heated gaseous products conducted away from the heater. The relative rate at which gas and air are supplied to the heater should be so regulated that the temperature of the gaseous products after combustion shall not be so high as to injure the metering devices; the latter are selected, however, from a type especially adapted to work under high temperature without injury. A simultaneous reading of the three meters, over any desired period of time, is taken. From these readings the calorific power of the fuel supplied may be known from the following mathematical relationship. Let G be the volume of fuel admitted, A the volume of air introduced, and P the volume of the products of combustion, including whatever dilution of air be present. Let the calorific power of the fuel, per unit of volume, be represented by B. T. U., while C represents a constant dependent upon the units of volume and of heat selected, and upon the barometer pressure prevailing at the time. Then, neglecting for the moment the influence of moisture in the atmosphere, it becomes true that $$\text{B. T. U.} = C\frac{(P-A)-G}{G}$$

Should very accurate determinations be desired, the moisture in the atmosphere may be allowed for by multiplying this result by one plus a constant $c$, which will amount to 1% only in very warm air, well moistened, such as need not be incurred in ordinary latitudes and climates. Assuming the instrument to be adjusted to read correctly under a medium degree of moisture in the atmosphere, any variations thereof likely to be incurred in practice will affect the result only by a very small fraction of 1%.

It is further to be noticed, in considering the operation of this new method, that the results are not affected at all by any ordinary variations in either the temperature or the volume of entering air A; for there results therefrom automatically, as soon as the air within the instrument has been displaced, and the temperature of the sheet-metal parts correspondingly affected, an adjustment of the value of P which exactly off-sets its influence. Moreover, because the metering-instruments are of an integrating type, any such temporary error due to lag in the calorimeter, should it occur within a period of observation, is carried along and canceled automatically later, by the corresponding lag when the volume or temperature of A chances to return again toward an average value. Therefore (P—A) is alone the true variable to be determined in terms of G. For these reasons, and to minimize the number of readings needed for an observation, it is a further object of my invention to so combine mechanically the indexes of the air-intake and discharge-meters as to provide a single index, reading the values of (P—A) in the above equation. This is accomplished by mechanically differentiating the movement of certain members in the metering means. For instance, in the embodiment illustrated, a rotary impulse meter is employed to measure the incoming air. It has a vane-member rotating commensurately with the volume-rate of air supplied to the heater. In like manner a rotary impulse meter mechanism employing a vane rotating commensurately with the volume-rate of the discharge of heated gaseous products from the heater is employed. A differential gear is connected respectively to these two rotating vane members and the differential gear is employed to actuate a single index, which is geared to give a direct reading of (P—A). When this feature of the invention is employed, only two meters have to be read to determine the calorific power of the gas being tested. The invention also broadly contemplates the combining, in a similar manner of any two or more movable members in the metering mechanism.

A further object of the invention is to provide an improved apparatus for the employment of the principles of this invention. These and other objects of the invention are pointed out in the claims and will be apparent from the following description, when read in connection with the accompanying drawings forming part of this application and in which,—

Figure 1 is a vertical section of one embodiment of the calorimeter, showing parts broken away and in front elevation. Fig. 2 is a similar view of a modification. Fig. 3 is a horizontal section through line III—III of Fig. 2; Fig. 4 is an enlarged vertical section through the differential gear of Fig. 1, showing parts in elevation; and Fig. 5 is a diagram showing another modification.

Referring now more in detail to the drawings and particularly to Figs. 1 and 2,—1 indicates a suitable base from which the various parts of the apparatus may be supported by suitable legs 2. A heater, in the form of a tubular shell 3, is provided and is shown formed with an outturned flange 4 seated upon a ledge 5 secured to an outer casing 6. Although the tubular shell 3 is shown cylindrical, it is to be understood that any suitable configuration is contemplated and that it is not necessary that its diameter or cross section be uniform. The lower end of the shell 3 is open and has secured to it in a suitable manner a spider 7 which supports a gas burner 8 shown in the form of a Bunsen burner. The duct for conducting gas to this burner is indicated by 9. The heater 3 provides a combustion chamber 10 in its interior. The outer shell 6 comprises a lower removable section 11 and together with the flange 4 and ledge 5 forms a complete inclosure about the tubular shell 3, the interior of which is in communication with the interior of the shell 3 through its lower open end. In the construction illustrated the outer shell 6 is shown surrounded by a casing 12 providing a non-heat-conducting envelop 13 of dead air, although this non-heat-conducting envelop may be provided in any suitable manner as by the employment of other non-heat-conducting material than air. This casing 12 is shown provided with a lower removable section 14 giving access to the removable section 11 of the outer casing 12.

Arranged alongside of the parts described is shown a tubular air intake 15 in the form of a vertically arranged tube fitted at its upper end with a port plate 16 provided with ports 17 giving entrance into the hollow header 18 which connects with the interior of the outer casing 6 at its upper portion. A duct or passage 19 is therefore provided from the outer air, to and about the heater 3 and to the combustion chamber 10. In Fig. 1 this passage is shown divided into two parts between the tubular shell 3 and the outer casing 6 by means of a heat radiation shield 20, shown in the form of an open ended cylinder supported on legs 21 resting on the section 11. It may be held centered about the shell 3 by means of centering fingers 22. This shield 20 may be made of non-heat-conducting material or of metal. I may also place a similar tubular heat-shield around the frame and within the heat-chamber 3, with air rising both within and around the same. This method of heat insulation by dividing a given flow between two concentric paths, whereby it passes through the same, in multiple portions, is quite different from and superior to the present method of passing the entire fluid through one after another of the concentric paths, in series. In the former, one part jackets another; in the latter the whole jackets itself. The upper end of the tubular shell 3 is closed by a port plate 23 provided with ports 24 opening into the header 25 formed by an upward extension of the casing 6 and connected into the chimney 26. In the construction shown these ports 24 form the sole means of egress for all the gaseous products which are conducted into the calorimeter or which are produced therein.

The duct 19 through which air is admitted to the calorimeter surrounds and extends the length of the heater in the form of the tubular shell 3 providing the combustion chamber 10. It then empties into the combustion chamber 10 direct, although a part may be first deflected through the openings 27 provided in the base of the Bunsen burner 8. The air thus introduced is to accomplish two functions,—one, to support combustion and, the other, to absorb the heat generated by the combustion of the combustible gas. It is, therefore, to be understood that it is by no means necessary that the entire volume of air introduced into the calorimeter be actually passed through the combustion-chamber, although such passage through the combustion-chamber insures a complete absorption of heat by the incoming air. What is necessary, however, is that sufficient air be supplied to accomplish the complete combustion of the combustible gas and a sufficient excess be supplied for the purposes of measuring the heat generated by the novel expansion method, and without injury to the meter. This necessitates that the gaseous fluid, such as air, employed as a heat absorbing agent, be caused to pass in such close proximity to the heater as to absorb the heat generated. It is also to be understood that the cooling gaseous fluid need not be air, provided sufficient oxygen is supplied to support the combustion of the combustion gas or other fuel.

For the purpose of giving access to the combustion chamber alined openings are provided in the parts inclosing it. Of these openings, 28 indicates that through the tubular shell 3 and 29 that through the radiation shield 20, while the alined openings through the casings 6 and 12 are shown filled with a cylindrical window frame 30 having screw threaded engagement with the casing 6 and fitted with windows 31 and 32 spaced apart and providing a dead air space 33 therebetween. An opaque shielding door 34 is also hinged across these alined openings and it may be swung clear of them at will so as to inspect the chamber 10 or to remove the frame 30 to give access to the combustion chamber 10, as for the purpose of igniting the gas at burner 8.

A gas meter 35 of suitable construction to measure the volume of gas passed through it from the source of supply 36 is connected into the duct 9 controlled by the valve 37. The volume of gas having passed the meter 35 may be read from the dial 38 in a well known manner.

The port plate 16 with its ports 17 is indicated as part of a well known rotary meter construction in which the vane 39 is caused to rotate in the direction of the arrow according to the principle of turbine. The vane 39 imparts a similar rotation to the spindle 40 suitably journaled as indicated, and arranged to drive the index 41 to give a reading of the volume of gas having passed through the ports 17, it being understood that the vane 39, therefore, moves (rotates) commensurately with the volumetric rate of conduction of air through the ports 17 to the heater 3.

The bevel gear 42, mounted on the spindle 40, through the medium of the intermeshing bevel gear 43 imparts a rotary movement, in the direction of the arrow, to the shaft 44 suitably journaled as indicated and having fixed to its left hand end the beveled gear 45 of the differential gear box 46. It passes loosely through the hub 47 of the differential gear box 46 which is thereby journaled at that end on the shaft 44.

A vane 48, similar to the vane 39, coöperates with the ports 24 and imparts a rotary movement, in the direction of the arrow, to the spindle 49 and the bevel gear 50 fixed thereon. Bevel gear 50 is shown intermeshed with the bevel gear 51 fixed to the horizontally journaled shaft 52, the rotation for which is in the direction of the arrow and which, through the medium of the reduction gears 53, 54, 55 and 56, imparts rotation to the shaft 57 in the direction of the arrow. The shaft 57 is journaled loosely in the hub 58 of the differentiated gear box 46 and has fixed to its end a bevel gear 59, similar to the bevel gear 45.

Planet bevel gears 60 are loosely journaled on the spindle 61 which is mounted in the differential gear box 46 at right angles to the axis of shafts 44 and 57. Suitably formed on the gear box 46 is a gear 62 shown in mesh with the spur gear 63 fixed to the drive shaft 64 for the differential index mechanism 65.

The vane 48 is a member movable (rotatable) commensurately with the volume of the conduction of heated gaseous products from the calorimeter and it is further to be understood that the meter 35 for the combustible gas may be of the type also having a member movable commensurately with the volume rate of the conduction of gas therethrough. As a matter of fact a volumetric meter must have such a member.

The chimney 26 is a provision for causing a flow of air into the calorimeter and an outflow of gaseous products through the discharge openings or ports 24. The fan 66 is a like provision, and it is to be understood that it may be driven from any suitable source of energy, either electrical, as shown in the drawings, or otherwise.

Dampers 67 and 68 are shown for regulating the flow of gaseous fluid through the calorimeter, while baffle plates 69 and 70 are also shown in the tubular intake 15 to regulate and make uniform the flow of air through the various ports 17. All such devices may be employed where desired or may be omitted.

In Figs. 2 and 3 there has been illustrated a less elaborate embodiment of the calorimeter, in which the gas meter 35 is shown connected with the duct 9 by means of a more or less extensive connection 71. It is to be understood that this gas meter may, for many purposes, be the gas meter ordinarily installed in a house or plant employing gas. Furthermore, in this construction, the Bunsen burner 8 is shown supported by the removable section 11 of the casing 6, although it may be preferable to support the burner by means of a spider 7 as previously described in connection with Fig. 1, so as to prevent the conduction of heat to the exposed parts of the calorimeter construction. In this construction the radiation shield 20 is omitted and the shaft 49 for the vane 48 is shown connected with the index device 72 to give a direct reading of the volume of gas which flows through the ports 24. A transparent window 73 through the header 25 is also indicated to make the index 72 visible from the exterior. All the mechanism for combining, as by differentiating, the movements of the vanes 39 and 48 is omitted from this embodiment so that it is obvious that the three indices must of necessity be read simultaneously when employing the instrument of this type shown in Figs. 2 and 3.

As has previously been pointed out, it is not essential to the general principles involved in this mode of calibration for the heat absorbing fluid to pass through the combustion chamber. In Fig. 5 there is illustrated diagrammatically a construction in which the combustible supplied is measured by the meter 35; the air or oxygen supplied to support combustion in the combustion chamber is measured by the meter 74; the gaseous heat absorbing fluid supplied is measured by the meter 75; the escaping products of combustion are measured by the meter 76; and the escaping heat absorbing gaseous fluid is measured by the meter 77. In this embodiment the combustion chamber 10 and burner 8 are present while a cooling or heat absorbing duct 19 is provided about the heater 3 and in a manner similar to those shown in connection with the constructions previously described. The expansion or increase in volume, caused by and from which the heating power of the combustible material may be obtained, is given by subtracting the sum of the volumetric readings of meters 35, 74 and 75 from the sum of the volumetric readings of meters 76 and 77. The result divided by the reading of the meter 35 and multiplied by a suitable constant gives the true calorific power of the combustible. This diagrammatic illustration should be useful in determining the many modifications to which the application of the broad principles of this invention is capable.

It has been mentioned previously that the invention contemplates the combining of two or more volumetric rates. In Fig. 1 this was done by differential gearing in one instance and by physically mixing the cooling air and products of combustion in the combustion chamber 10 in another instance. Fig. 5 shows all volumetric rates measured individually, although it is clear that any two or more of these volumetric rates may be combined in any of the modes described.

Fig. 5 is embodied to show the large number of metering devices necessary unless the combination contemplated by the applicant is employed, although the embodiment indicated in Fig. 5 is within the broad terms of the applicant's invention. It is further to be understood that Fig. 5 illustrates a modification of my invention which, in its preferable form of reduction to practice, would embody the exaggeration of the heat-conducting surface between chambers 10 and 19 to such an extent that all of the heat developed by combustion would be transferred from the gases in 10 to those in 19. In this event meters 74 and 76 would read alike and would drop out of the computation of results. Therefore their indexes may be omitted from the apparatus. Such might be the preferable procedure when liquid fuel were used, whereby meters 74 and 76 would read differently from chemical influences, even when handling gases identical in temperature; or it might become desirable when other chemical processes than combustion were subject to investigation. It is further to be understood that in any such an embodiment it would become desirable to reverse the direction of flow through duct 19, in order that the gases therein might extract from those in 10 the last portion of heat. In such case 77 would become the inlet-meter and 75 the outlet-meter, and their readings would be used in computing results in corresponding manner. For such a development of the diagrammatic arrangement of Fig. 5 into practicable embodiment, any or all of the devices in Figs. 1, 2, 3 and 4 may obviously be employed, while the said reversed direction of flow through duct 19 is shown in Figs. 1 and 2.

The specific embodiment of this invention to be preferred depends considerably upon the service desired. For instance, an embodiment such as that described in connection with Fig. 5 is particularly adapted for service as a gross heat meter in contradistinction to a net heat meter. The heat absorbing medium passing through the duct 19 can be caused to cool down the products of combustion within chamber 10 below 212° Fahrenheit so as to condense any moisture resulting from the combustion of hydrogen and thereby reclaim the latent heat of the steam, in which form the moisture was created by the combustion.

The preferred embodiment of the invention is illustrated in Figs. 1 and 4 and it is believed that its operation will be obvious to those skilled in the art. In general, combustible gas under its own pressure is caused to be conducted to the burner 8, where it is ignited through the opening 28. The supply of air, properly to support combustion and to maintain a sufficiently low temperature for the apparatus located above the chamber 10, is regulated by means of the dampers 67 and 68 and the speed of the fan 66. In connection with this regulation the reading of meter index 41 may prove serviceable as practice will show that a certain rate of flow for the air is desirable. In the embodiment of the invention shown in Fig. 1 the only purpose for meter index 41 is to facilitate the starting of the test by determining the actual rate of flow of air into the calorimeter. After effecting the proper proportion between the rate at which air and gas is supplied to the calorimeter, a simultaneous reading of gas meter 35 and the differential index 65 continue in operation for an indefinite period, after which period a second simultaneous reading of the meters 35 and 65 should be taken. The difference between the readings of meter 35 gives the volume of gas consumed $=G$, while the difference in the two readings of the index 65 will give the value of $(P-A)$ in the equation previously referred to, it being understood that the gearing for the index 65 is so arranged as to insure a correct reading according to the unit employed, this being likewise true for the indexes of all meters.

In the construction of the calorimeter, it is desirable that the heat-absorbing power of the various parts of the apparatus be low, in the furtherance of which it may be desirable to construct as many parts as possible of material having a low specific heat. In any event, because of the employment of gaseous fluid as the heat absorbing agent, the instrument is capable of responding very quickly to changes in the calorific power of or in the rate of flow of the combustible being tested.

It is further contemplated, in this invention, that this novel method for the determination of the energy developed in a given chemical action, by the measurement of the volumetric increase in the gases employed, is not to be confined to that particular chemical reaction called combustion or oxidation. In the chemical arts there are employed many processes where a useful record of the reaction occurring may be obtained by the employment of this invention, suitably modified to fit the particular substances handled. In this respect the words "calorimeter," "flame," "combustion - chamber," etc., in the claims are to be understood as including similar apparatus for chemical reactions other than combustion.

What is claimed and what is desired to be secured by United States Letters Patent is:—

1. In a calorimeter as an article of manufacture, a heater providing a combustion chamber; means for conducting combustible to said chamber; means for conducting air to said heater; means for conducting heated gaseous products from the calorimeter; and metering means, comprising a member movable commensurately with the volume-rate of the conduction of air to said heater and a member movable commensurately with the volume-rate of the conduction of heated gaseous products from said calorimeter.

2. In a calorimeter as an article of manufacture, a heater providing a combustion chamber; means for conducting combustible to said chamber; means for conducting air to said heater; means for conducting heated gaseous products from the calorimeter; and metering means, comprising a member movable commensurately with the volume-rate of the combustion of air to said heater, a member movable commensurately with the volume-rate of the conduction of heated gaseous products from said calorimeter and means for differentiating the movements of said members.

3. In a calorimeter as an article of manufacture, a heater providing a combustion chamber; means for conducting combustible to said chamber; means for conducting air to said heater; means for conducting heated gaseous products from the calorimeter; and metering means, comprising a member movable commensurately with the volume-rate of the conduction of air to said heater, a member movable commensurately with the volume-rate of the conduction of heated gaseous products from said calorimeter, an index for one of said members to give a visible reading of its movement, means for differentiating the movements of said members, and an index to give a visible reading for and record of said means for differentiating.

4. In a calorimeter combination, a heater providing a combustion chamber; means for conducting combustible to said chamber; means for conducting air to said heater; means for conducting heated gaseous products from the calorimeter; and metering means, comprising a member movable commensurately with the rate of the conduction of combustible to said chamber, a member movable commensurately with the volume-rate of the conduction of air to said heater, and a member movable commensurately with the volume-rate of the conduction of heated gaseous products from said calorimeter.

5. In a calorimeter combination, a heater providing a combustion chamber; means for conducting combustible to said chamber; means for conducting air to said heater; means for conducting heated gaseous products from the calorimeter; and metering means, comprising a member movable commensurately with the rate of the conduction of combustible to said chamber, a member movable commensurately with the volume-rate of the conduction of air to said heater, a member movable commensurately with the volume-rate of the conduction of heated gaseous products from said calorimeter and means for combining the movements of a plurality of said movable members.

6. In a calorimeter combination, a heater providing a combustion chamber; means for conducting combustible to said chamber; means for conducting air to said heater; means for conducting heated gaseous products from the calorimeter; and metering means, comprising a member movable commensurately with the rate of the conduction of combustible to said chamber, a member movable commensurately with the volume-rate of the conduction of air to said heater, a member movable commensurately with the volume-rate of the conduction of heated gaseous products from said calorimeter, and means for differentiating the movements of said members movable commensurately with the volume-rates of conduction of gases to and from said calorimeter respectively.

7. In a calorimeter combination, a heater providing a combustion chamber; means for conducting combustible to said chamber; means for conducting air to said heater; means for conducting heated gaseous products from the calorimeter; and metering means, comprising a member movable commensurately with the rate of the conduction of combustible to said chamber, a member movable commensurately with the volume-rate of the conduction of air to said heater, a member movable commensurately with the volume-rate of the conduction of heated gaseous products from said calorimeter, and an index for each of a plurality of said movable members to give a visible reading and record of its movement.

8. In a calorimeter combination, a heater providing a combustion chamber; means for conducting combustible to said chamber; means for conducting air to said heater; means for conducting heated gaseous products from the calorimeter; and metering means, comprising a member movable commensurately with the rate of the conduction of combustible to said chamber, a member movable commensurately with the volume-rate of the conduction of air to said heater, a member movable commensurately with the volume-rate of the conduction of heated gaseous products from said calorimeter, an index for each of a plurality of said movable members to give a visible reading and record of its movement, means for combining the movements of a plurality of said movable members, and an index to give a visible reading and record of said combined movement.

9. In a calorimeter combination, a heater providing a combustion chamber; means for conducting combustible to said chamber; means for conducting air to said heater; means for conducting heated gaseous products from the calorimeter; and metering means, comprising a member movable commensurately with the rate of the conduction of combustible to said chamber, a member movable commensurately with the volume-rate of the conduction of air to said heater, a member movable commensurately with the volume-rate of the conduction of heated gaseous products from said calorimeter, an index for each of a plurality of said movable members to give a visible reading and record of its movement, means for differentiating the movements of said members movable commensurately with the volume-rate of flow of gases to and from said calorimeter respectively, and an index to give a visible reading of said differentiated movement.

10. A calorimeter comprising a tubular shell providing a combustion chamber and having an intake opening at one end and a discharge opening at the other end; a casing enveloping said tubular shell and providing an air-duct about said tubular shell and connecting into said intake opening; and a tubular heat-radiation-shield located between said tubular shell and said casing.

11. In a calorimeter, the combination of a combustion-chamber; means for conducting gaseous flow to and through said chamber; and means for dividing said flow between a plurality of substantially concentric paths, whereby one portion jackets another.

12. A calorimeter comprising a tubular shell providing a combustion chamber and having an intake opening at one end and a discharge opening at the other end; a casing enveloping said tubular shell and providing an air-duct about said tubular shell and connecting into said intake opening; and an exterior casing providing a non-heat-conducting envelop about said casing.

13. A calorimeter comprising a tubular shell providing a combustion chamber and having an intake opening at one end and a discharge opening at the other end; a casing enveloping said tubular shell and providing an air-duct inclosing about said tubular shell and connecting into said intake opening, said calorimeter having a power driven fan for causing a flow of air into said casing, about said tubular shell, into said intake opening and out of said discharge opening.

14. A calorimeter comprising a tubular shell providing a combustion chamber and having an intake opening at one end and a discharge opening at the other end; a casing enveloping said tubular shell and providing an air-duct about said tubular shell and connecting into said intake opening; an exterior casing providing a non-heat-conducting envelop about said casing; the parts inclosing said chamber having provisions for inspecting the interior of said chamber comprising alined openings; and closing means for said openings.

15. In a calorimeter, a shell providing an internal combustion-chamber and having a heat-retaining casing; an air-duct leading into said combustion-chamber; a duct leading from said chamber; a duct for supplying combustible to said chamber; provisions for causing air to flow through said air-duct into said chamber; metering means for said air-duct of the turbine type for measuring the volume-rate of flow of air therethrough; and metering means of the turbine type for measuring the volume-rate of out-flow of gaseous products from said chamber.

16. A calorimeter arranged for a continuous inflow and a continuous outflow of heat-absorbing fluid comprising, a rotary vane driven commensurately with the volume-rate of said inflow and a second rotary vane driven commensurately with the volume-rate of said outflow; an index device; and means comprising a differential gear for mutually coupling said rotary vanes with said index device to effect the recording of the difference between the rate of said outflow and the rate of said inflow.

17. The mode of determining the calorific value of combustibles comprising, the employment of a gaseous fluid to absorb the heat of combustion; causing said gaseous fluid to flow into and out of heat absorbing relation with the heat-source; measuring the volume of the in-flow and the volume of the out-flow of said gaseous fluid; and determining the heat absorbed from the volumetric expansion of said gaseous fluid as given by the volume-difference between said out-flow and said in-flow.

18. The mode of determining the calorific value of combustibles comprising absorbing the heat of combustion in a continuously flowing gaseous fluid; and measuring the consequent expansion of said gaseous fluid.

19. The mode of determining the calorific value of combustibles comprising, absorbing the heat of combustion by a continuously flowing fluid and determining the amount of heat so absorbed by measuring the expansion of said fluid.

20. The mode of determining the calorific value of a combustible comprising, causing the combustion of a certain volume of said combustible together with a certain volume of air, both initially at the same temperature and measuring the resultant volume of heated gaseous products.

21. The mode of determining the calorific value of a combustible comprising, continuously conducting said combustible to a heater; continuously conducting air to said heater to support combustion and to absorb the heat produced by combustion; continuously conducting the heated gaseous products, including the products of combustion and heated air, away from said heater; measuring the rate of conduction of combustible to said heater, and the volume-rate of all gaseous products conducted away from said heater; and determining the increase in volume-rate of all gaseous products conducted away from said heater over the volume-rate of the combustible and air conducted to said heater.

22. Means for determining the heat evolved by chemical reaction comprising, a heater providing a reaction chamber; means for causing a continuous flow of heat-absorbing fluid into and out of heat absorbing relation with said heater; and means for determining the consequent expansion of said heat-absorbing fluid.

23. Means for determining the heat evolved by chemical reaction comprising, a heater providing a reaction chamber; means for causing a continuous flow of heat-absorbing gaseous fluid into and out of heat absorbing relation with said heater; and means for determining the consequent expansion of said heat-absorbing gaseous fluid.

In witness whereof, I have signed my name to this specification, in the presence of two subscribing witnesses.

SIDNEY A. REEVE.

Witnesses:
SYDNEY COLEATT,
DONALD WYNNE.

---

Copies of this patent may be obtained for five cents each, by addressing the " Commissioner of Patents, Washington, D. C."